US008358097B2

(12) United States Patent
Cartwright

(10) Patent No.: US 8,358,097 B2
(45) Date of Patent: Jan. 22, 2013

(54) SYSTEM AND METHODS FOR CONTROLLING MOVEMENT OF A TRACK LIGHT SYSTEM

(76) Inventor: Brent A. Cartwright, Eureka, CA (US)

( * ) Notice: Subject to any disclaimer, the term of this patent is extended or adjusted under 35 U.S.C. 154(b) by 817 days.

(21) Appl. No.: 12/549,622

(22) Filed: Aug. 28, 2009

(65) Prior Publication Data

US 2010/0067244 A1    Mar. 18, 2010

Related U.S. Application Data

(60) Provisional application No. 61/097,371, filed on Sep. 16, 2008.

(51) Int. Cl.
*G05B 1/06* (2006.01)

(52) U.S. Cl. ............ 318/652; 318/653; 318/3; 700/282; 700/283; 700/306; 700/45; 700/55; 702/45; 702/55; 396/4; 396/266; 362/11; 362/1; 362/276; 362/802; 47/39

(58) Field of Classification Search .............. 318/3, 652, 318/653; 700/282, 284, 283, 45, 46, 47, 700/48, 49, 55, 306; 702/45, 55; 73/1.16; 362/286, 1, 276, 802; 47/39
See application file for complete search history.

(56) References Cited

U.S. PATENT DOCUMENTS

| 5,818,734 | A  | * | 10/1998 | Albright ...................... 700/306 |
| 7,111,952 | B2 | * | 9/2006 | Veskovic .......................... 362/1 |
| 7,363,112 | B2 | * | 4/2008 | Cartwright .................... 700/284 |
| 7,406,256 | B1 | * | 7/2008 | Adolphi et al. ................... 396/4 |
| 2010/0031564 | A1 | * | 2/2010 | Loebl et al. ....................... 47/39 |

* cited by examiner

*Primary Examiner* — Walter Benson
*Assistant Examiner* — Jorge Carrasquillo
(74) *Attorney, Agent, or Firm* — Donald R. Boys; Central Coast Patent Agency, Inc.

(57) ABSTRACT

A system for controlling a motorized track light system constrained to travel along a track has a control unit coupled to a motor that causes the track light system to move along the track, a plurality of stop sensors strategically disposed along the track, a sensor activation device located on the track light system, the sensor activation device positioned to interface with the stop sensors, and a light sensor for detecting ambient light of a preset level. The system detects a preset level of ambient light, initiating power to the motor of the track light system, moving the lights along the track until the activation device interfaces with a first of the plurality of stop sensors, stopping movement of the track light system along the track for a preset period of time, and at the end of the preset time period, the electrical power is restored to the motor moving the track light assembly along the track to the next of the plurality of stop sensors.

11 Claims, 7 Drawing Sheets

SYSTEM AND METHODS FOR CONTROLLING MOVEMENT OF A TRACK LIGHT SYSTEM

CROSS-REFERENCE TO RELATED APPLICATIONS

The present application claims priority to U.S. provisional patent application Ser. No. 61/097,371, filed on Sep. 16, 2008. The entire disclosure is included herein in its entirety at least by reference.

BACKGROUND OF THE INVENTION

1. Field of the Invention

The present invention is in the field of electronics and pertains particularly to methods and apparatus for controlling a track lighting system.

2. Discussion of the State of the Art

In the field of agriculture, indoor gardens with artificial lighting are leveraged to incubate and grow a wide variety of plants for the consumer market. Plants in an indoor garden are subject to temperature control and controlled artificial lighting adapted to mimic natural sunlight.

Some proprietors of indoor gardens employ motorized track lighting systems, termed light movers, to incubate and grow plants as opposed to fixed lighting systems. One advantage of a moving lighting system is that more garden area can be covered using fewer lamps and power. The track lighting systems constantly move over the garden area back and forth to give the plants uniform coverage.

A problem with current light mover systems is that they waste a lot of light and power relative to the energy that the plants can produce for growth (photosynthesis adenosine triphosphate or (ATP)). The constant back and forth motion of conventional light movers acts to change the photo (light) level striking the plants leaves. As a result, the plant's photo response is turned on and off much like an electronic switch. Many plants like corn, for example, require two to three hours of direct sunlight in order to grow to full potential.

Through the well-documented process of photosynthesis, plants convert photo energy striking their main water leaves into plant energy (sugar) to promote new cell growth. For corn and many other plants direct sunlight must be present for two to three hours daily. Current track lighting systems do not duplicate nature's arching photoperiod (the period of time that sunlight is available to the plants). Therefore the plants do not grow to full potential, and experience uneven growth rates and may appear stunted and spindly.

Therefore, what is clearly needed is a system for controlling a motorized track light system with preset timeouts. A system such as this would better duplicate natural and direct sunlight and help plants grow indoors to their full potential.

SUMMARY OF THE INVENTION

The problem stated above is that adequate lighting is desirable for an indoor garden area, but many of the conventional means for lighting the indoor garden area, such track light system, also create an uneven growing process and a waste of light and power relative to the potential amount of energy the plants can produce. The inventors therefore considered functional elements of a track lighting system, looking for elements that could potentially be harnessed to provide control of movement but in a manner that would not inhibit even and robust plant growth or waste light and energy.

Every indoor garden requires sufficient and direct lighting for plants to grow one by-product of which is an abundance of healthy plants allowed maximum time for photosynthesis to occur. Most such gardens are lighted using stationary or track lighting systems to attempt to simulate a natural arching photo period for the plants, and track lighting systems are typically part of such garden apparatus.

The present inventor realized in an inventive moment that if, at the point of activation, a track lighting system could be caused to move and stop for preset periods of time over the plants, significant growth might result. The inventor therefore constructed a unique control system for a track light system that allowed photosynthesis to occur in the plants at a more robust level, but constrained constant back and forth movement of the track light system over the plants. A significant uptake in plant growth speed and health results, with no significant drain on resources including energy.

Accordingly, in an embodiment of the present invention, a system for controlling a motorized track light system is provided comprising: a control unit with an electrical power input and output line, the control unit connected to the motor on the track light system by the output line, a plurality of stop sensors strategically disposed along the track of the track light system, a sensor activation magnet strategically located on a track lighting assembly of the track light system, the magnet positioned to interface with the stop sensors, and a sensor for detecting ambient light of a preset level. The system is characterized in that the sensor detects a preset level of ambient light causing power to the motor of the track light system via the electrical output line moving the lights along the track until the activation magnet interfaces with a first of the plurality of stop sensors thereby producing a voltage signal from the point of interface to the control unit interrupting the electrical power and stopping the motor and tracking of the track light system for a preset period of time whereby at the end of the preset time period, the electrical power is restored to the motor moving the lighting assembly of the track light system along the track to the next of the plurality of stop sensors.

In one embodiment the signal is a 5V direct current (DC). In one embodiment the system is used to control the supply of artificial lighting to an indoor garden. In one embodiment the plurality of stop sensors are wired in parallel. In one embodiment the DC is induced by the activation magnet. In one embodiment the wire connecting the plurality of sensors is a phone line connected to the control unit by a phone jack.

In one embodiment the preset time period is programmed into the control unit through a physical interface on the control unit. In one embodiment the voltage signal to the control unit resulting from magnetic interface with a stop sensor is ignored during and at the end of the preset time period with the aid of a piece of digital logic installed in the control unit.

According to another aspect of the invention, a method for adapting a track light system for preplanned stopping periods is provided. The method includes the steps (a) providing a control unit with an electrical power input and output line and connecting the control unit to a motor on the track light system by the output line, (b) installing a plurality of stop sensors at strategic points along the track of the track light system, (c) installing a stop sensor activation magnet to align with and interface with the stop sensors, (d) installing a light sensor to the control unit for detecting ambient light, (e) presetting the desired time period or time periods to stop movement of the track light system, and (e) connecting the electrical power input line to a power source.

In one aspect of the method, in step (b) the stop sensors are wired in parallel with respect to activation input. In one aspect in step (c) the activation magnet is bracketed to the support beam of the lighting assembly of the track light system. In one aspect in step (d) the light sensor is calibrated to detect ambient light at a specified level of light. In one aspect in step (e) the time period or periods are preset using a programming interface associated with the control unit.

According to another aspect of the invention, a method is provided for operating of a motorized track light system using a control unit with an electrical power input and output line, a plurality of stop sensors strategically disposed along the track of the track light system and a sensor activation magnet bracketed to a light support beam of the track light system comprising, (a) detecting a preset level of ambient light using a light sensor and transitioning from standby to active by supplying power to the track light system motor, (b) moving the light support beam along the track of the track light system until the sensor activation magnet interfaces with a stop sensor, (c) as a result of completion of step (b), sending a signal to the control unit interrupting power to the track light system motor stopping movement of the light support beam along the track for a preset period of time, (d) at the end of the preset time period of step (c), resuming power to the track light system motor and moving the light support beam along the track of the track light system until the sensor activation magnet interfaces with a next stop sensor, and (e) repeating the cycle of steps (c) and (d) for each subsequent stop sensor installed on the track of the track light system.

In one aspect of the method the motorized track light system is installed over an indoor garden. In one aspect in step (d) the stop signal is ignored with the aid of a piece of digital logic installed in the control unit. In one aspect a further step is added for moving from active to standby mode as a result of lowering the level of ambient light below the threshold preset for the ambient light sensor.

BRIEF DESCRIPTION OF THE DRAWING FIGURES

DETAILED DESCRIPTION

The inventor provides a unique control system for a motorized track light system enabling photosynthesis to occur in the plants at a more robust level. The new system incorporates preset timeouts into the movement of the system. The present invention is described in enabling detail in the following examples, which may represent more than one embodiment of the present invention.

Figure 1:
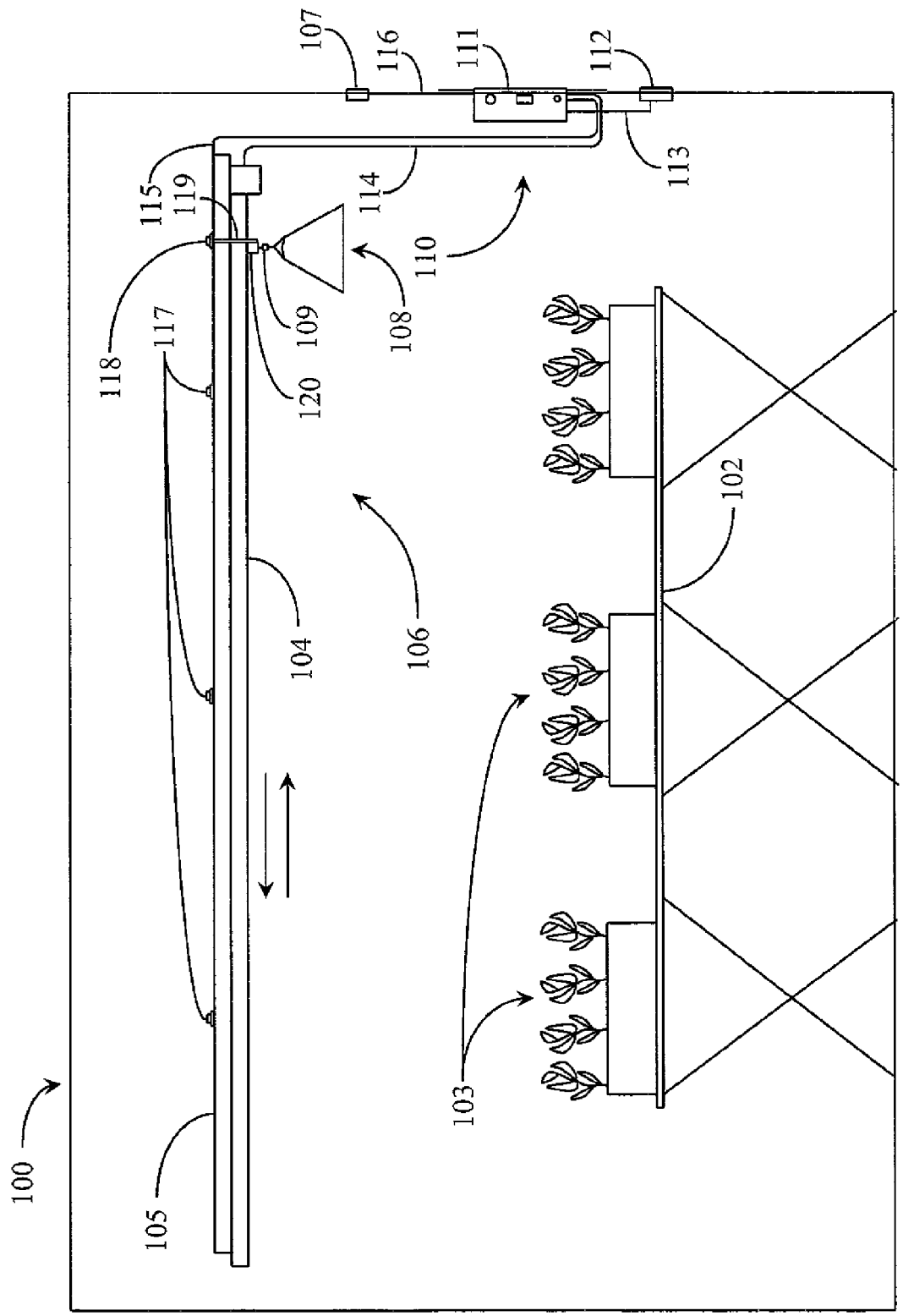
FIG. 1 is an elevation view of an indoor garden area with a track lighting system according to an embodiment of the present invention.

FIG. 1 is an elevation view of an indoor garden 100 with a track lighting system according to an embodiment of the present invention. Garden 100 is in this example an indoor garden that produces commercially for the consumer market. Indoor garden 100 has a plurality of plants 103 arranged in planter boxes and spaced evenly apart in rows on a table or other platform apparatus 102. In this view only the ends boxes with plants 103 are visible in each of four illustrated rows.

Indoor garden 100 has a motor driven track lighting system 106 supported by a track 104 and a support beam 105. In this example, the track lighting system is supported by support beam 105, however, other architectural arrangements are known to the inventor. Track lighting system 106 includes lamps 108 suspended from a lamp support member 109. Support member 109 is connected to a track bar 120 that fits into the track 104 of the system. Track lighting system 106 is typically chain driven (chain not illustrated), or it may be driven by some other type of power train. The lighting assembly of track lighting system 106 in FIG. 1 is positioned over the first planter of plants 103.

When in operation in one embodiment the system carries the lighting assembly to the $1^{st}$ stop sensor stopping for the preset time than to the $2^{nd}$ sensor and the $3^{rd}$ repeating the timeouts as the $1^{st}$ sensor. If setup is correct the photo period should end at the $3^{rd}$. sensor. When the photo period begins for the next day the moving parts of the assembly pass stop sensors 3, 2 & 1 because the flip flop logic has only a 1 count at its input, as the moving parts of the assembly turn around and head back to the $1^{st}$ stop sensor, the activation magnet aligns with the $1^{st}$ stop sensor, at that time the moving parts of the assembly and activation magnet will stop because that sensors flip flop now has 2 counts at its input, satisfying requirements for stop condition. For a very large garden area there may be more than one track lighting system in operation at the same time. Track lighting system 106 in this example is positioned on a track that houses a track motor.

In one embodiment of the present invention a track light control system 110 is provided and integrated with track lighting system 106. Control system 110 includes an electronic control unit 111 mounted to a wall in this example in proximity to the track housing the motor of the track lighting system. Control unit 111 is powered by 120 volts alternating current (AC) and can be plugged into an electrical power outlet 112 via power cord 113. Control unit 111 has a power outlet built into the control unit housing so that track lighting system 106 may be powered through the control unit. Track lighting system 106 has a power cord 114 that plugs into control unit 111 at the electrical output provided for the purpose.

Control unit 111 is adapted to control the movement of track lighting system 106 in a preprogrammed manner that includes creating stop periods corresponding with recommended "photoperiods" (hours of direct lighting) for certain of plants 103. Control unit 111 may be manufactured using off-the-shelf electrical components encased in a polymer or metal housing. Control system 110 also includes a plurality of stop sensors 117 that may be wired together in parallel to a signal line 115 that plugs into control unit 111. Stop sensors 117 may be magnetically activated coil sensors that carry a magnetically induced current or voltage when they are activated.

Sensors 117 are strategically placed along support beam 105 and each sensor may correspond to a strategic a stop position over a planter of plants 103. For example, there are three planters in the first row, and three stop sensors are strategically placed along the support beam. In one embodiment the track lighting system covers more than one planter at a stop, such as perhaps several planters clustered together.

Stop sensors 117 are placed at desired stopping or timeout points for the lighting assembly of track lighting system 106. The stop sensors may are placed in a position above the track of the system such as on support member 105. There may be other architectures known in the art so the placement location of stop sensors 117 in this example should not be construed as limiting in any way. Placement of the stop sensors depends in part of garden area division. For example, the practitioner may divide the garden area up into equal parts that will be adequately covered by the lighting assembly. In this example, signal line 115 is a telephone line that carries a 5 volt signal to control unit 111 each time a stop sensor is activated.

Control system 110 includes a stop-sensor activation magnet 118 mounted atop a bracket 119 that is in turn mounted to lamp support member 109. Activation magnet 118 is mounted such that it moves along with the lighting system when in motion and makes close contact with sensors 117 so as to activate them when it comes into close alignment. The magnet is installed close enough to the sensor line to interface with each sensor in the line, causing a stop sensor signal to be propagated to the control unit each time the magnet passes a stop sensor. As the tracked lighting assembly moves along the track each stop sensor placed along the track is activated by the activation magnet bracketed to lamp support member 109.

Control unit 111 includes a photo sensor 107 capable of detecting ambient light at a preset level. Photo sensor 107 is connected to control unit 111 by a sensor line 116. Sensor line 116 may also provide power to sensor 107 from control unit 111 or sensor unit 107 may be self contained. In one embodiment of the present invention, both stop sensors 117 and photo sensor 107 are wireless sensors capable of communicating to control unit 111 via wireless signal transmission. In this case control unit 111 would possess the required wireless components to enable wireless reception of a signal. Sensor 107 is mounted to the wall in this example at a level above the tallest plants being processed. Sensor 107 may be calibrated to start the entire system by detecting a preset level of ambient light such as the garden area lights coming on.

Control unit 111 is configured to stand by when all of the garden area lights are shut off. Control unit 111 moves to operational mode when sensor 107 detects light at a preset level. Upon detecting light, such as the garden area lights coming on control unit 111 supplies power to the motor of the track lighting system through power cord 114. The track lighting system then moves the lighting assembly along track 104 to the first stop sensor. A small voltage signal (5V) is sent from the point of the first stop sensor to control unit 111 as activation magnet 118 comes into close alignment with the stop sensor (117). The signal propagated to the control unit along sensor line 115 causes control unit 111 to switch off power to the track lighting system effectively stopping the system in its track for a preset period of time. At the end of the preset time period the control unit restores power to the track lighting system and the system carries the lighting assembly to the next stop sensor where the next timeout will be exercised Each time that the track lighting system is stopped at a stop sensor, the preset time period window begins and the system remains motionless until the end of that preset period. The cycle repeats itself for all of the installed stop sensors. The exact length of the preset stop time window (timeout) may vary, but depends in part on the overall time that the lights are on (photoperiod) and the user's application. For example, for a 16 hour photoperiod with new seedlings, only a one to two hour timeout would be required per stop. If the garden contains growing plants beyond the seedling stage and the photoperiod is 16 hours, then the timeout period required would be four to eight hours per stop. If the garden contains flowering plants and has a smaller photoperiod of say 12 hours, then a reasonable timeout period may be 3 to 6 hours per stop. Typical timeouts might be two to several hours long. It is noted herein that a photoperiod may be any amount of time up to 24 hours and a timeout is preset using an optional range of 1 to 10 hours.

In this example plants 103 are in flowering mode and the photoperiod, or time that the overhead lights remain on, is 12 hours. When the lights come on as detected by photo sensor 107, lighting assembly 106 moves in operational mode (from standby mode) to a first inline stop sensor 117 and stops, activating the system timer for a certain amount of time. At the end of the preset time period the lighting assembly moves to the next inline stop sensor and repeats the timeout cycle. In this case the timeout period at each stop sensor is four hours in order to divide the light coverage evenly over the planters for the 12 hour photoperiod. Other photoperiods and timeout periods are observed for plants in other stages of growth.

The mentioned times are not a limiting factor in practice of the present invention. At the end of the final four hour timeout period, lighting assembly 106 goes back into standby mode as a result of photo sensor 107 reporting a no-light condition or more specifically, light detection below a preset threshold (calibration). When the next photoperiod arrives, lighting assembly 106 will travel to the end of track 104, turn around, and move to the first stop sensor it comes to in the direction opposite from the previous photoperiod.

Figure 2:
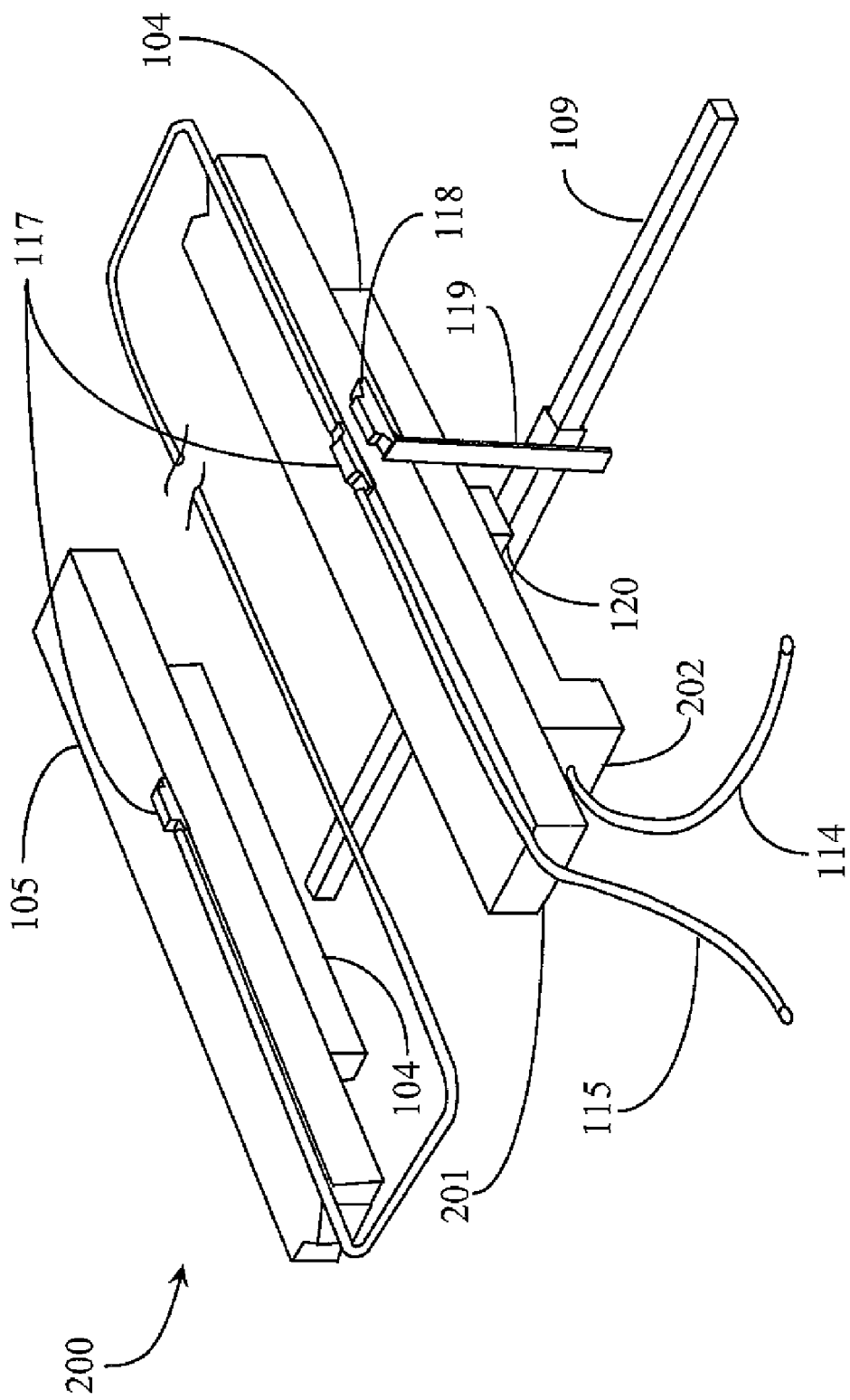
FIG. 2 is a perspective view of a track lighting system support structure illustrating sensor placement and magnet placement according to an embodiment of the present invention.

FIG. 2 is a perspective view of a track lighting system support structure 200 illustrating sensor placement and magnet placement according to an embodiment of the present invention. Support structure 200 includes many of the same components introduced in FIG. 1 above. Those components that are unchanged in this embodiment retain their original element numbers and are not reintroduced.

Lamp support member 109 is illustrated without the lamps. Lamp support member is connected to track 104 by track bar 120 and is positioned on the track that houses the track lighting system motor. A motor housing 202 encloses and protects the motor. Tracks 104 are additionally supported in this example by a support members 105 as described earlier in the specification. Other architectures may be possible without departing from the spirit and scope of the present invention. Support members 105 are shown in partial or broken form with respect to length. Bracket 119 is fixed to lamp support member 109 and supports activation magnet 118. Activation magnet 118 is illustrated in alignment with a stop sensor 117. Sensor line 115 connects the stop sensors together in parallel.

In this example, stop sensors 117 are strategically placed on the top of support beams 105. Bracket 119 is of a length sufficient to reach the top of the support beams for alignment purposes. Stop sensors 117 may be adapted with brackets or other mounting hardware for mounting to the upper surface of support beams 105. In one embodiment bracket 119 may be adjustable in length to accommodate differences in track lighting system architectures. Sensor line 115 leads to the control unit of FIG. 1 as does power cord 114.

Figure 3:
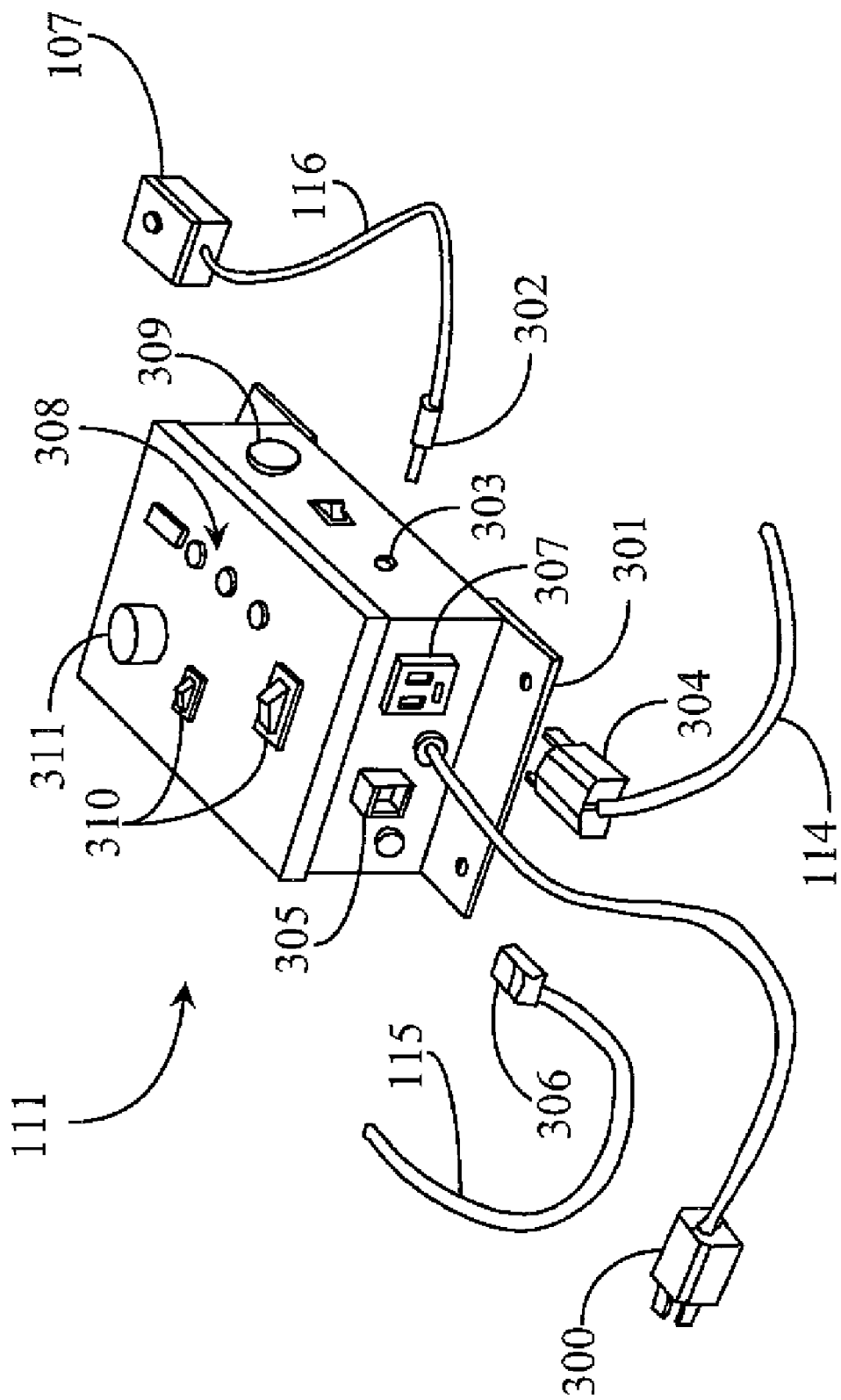
FIG. 3 is a perspective view of the control unit of FIG. 1 according to an embodiment of the present invention.

FIG. 3 is a perspective view of control unit 111 of FIG. 1 according to an embodiment of the present invention. This embodiment includes components that were previously introduced in FIG. 1. Those components previously introduced that have not changed in this example retain their original element numbers and are not reintroduced. Control unit 111 includes mounting brackets 301 for wall mounting. Sensor 107 connects to control unit 111 at a sensor line jack 303. A plug 302 provided at the end of line 116 is adapted to fit into jack 303.

Power into the control unit is supplied by AC via a plug 300 and power cord 113. Power to the track light system motor is provided through plug 304, which plugs into a power outlet 307 provided on the unit. Stop sensor line 115 has a phone plug 306 at the free end, which plugs into a telephone jack 305 provided on the unit and adapted for the purpose. A panel fuse holder 312 is provided to control unit 111 and located next to phone jack 305.

In one embodiment control unit 111 has switches 310a, 310b (top) and 310c (side) provided strategically through the device housing. Switch 310a may be a power on/power off switch. Switch 310b may be a text switch or a manual switch to engage operational mode. Switch 310c (side wall) may be an audio alarm on/off switch. Fewer or more switches of varied function may be provided without departing from the spirit and scope of the present invention.

In one embodiment, a switch 311 is provided to enable a user to select the number of hours and/or minutes to pause the system at one or more stop sensor positions. An audio alarm speaker 309 is provided on the side of the unit 111 to indicate the lights are moving to the next stop sensor and will automatically shut off when the timer mode is activated (generally used while setting up system). The audible alarm can be shut off via panel switch 310 once the initial setup is complete or left on to hear the transport times of the moving parts of the assembly.

A plurality of light emitting diodes (LEDs) 308 may be provided that are visible to a user visually checking control unit 111. In one arrangement, three round LEDs are provided and may comprise a green LED, a red LED, and a yellow LED. Green may indicate that the lighting assembly is moving from one stop sensor to the next in operational mode. Red may indicate that the lighting assembly has stopped moving and the unit is in the timer mode. Yellow may indicate that the garden area lights are off and the unit is in standby mode. The rectangular LED display is (adjacent to the colored LED's). LED display is off in standby mode.

In this example, a photoperiod is the overall time that the garden lights are on. A timeout is the overall time that the track lighting system is stopped by the control unit at one stop sensor position. Control unit 111 includes a clock and a timer to indicate the end of a timeout period. Three are provided to indicate to the user which setting is on.

In another embodiment the programming interface has a mechanism for entering data input into the system, such as the total photoperiod, the stage of the plants and the number of divisions of the garden area (number of stop sensors). The system may suggest the required timeout period and the user may then set the period suggested. The total number of timeouts should not surpass the overall photoperiod. In that case a second system might be required.

In one embodiment the programming interface mechanism is a keypad for entering data (keypad not illustrated). In one embodiment the programming interface is a touch screen interface presenting a series of selectable options for data input. In still another embodiment unit 111 includes a USB or other computer interface and may be programmed using a computer running a display. In this example, photo sensor 107 may be turned on or off while the unit is plugged in enabling programming and setup whether or not garden lights are on. When the unit is plugged in and the lights are turned off then a user may power on sensor 107, which will activate the system to operational mode when the garden area lights are turned on marking the beginning of a photoperiod.

Figure 4:
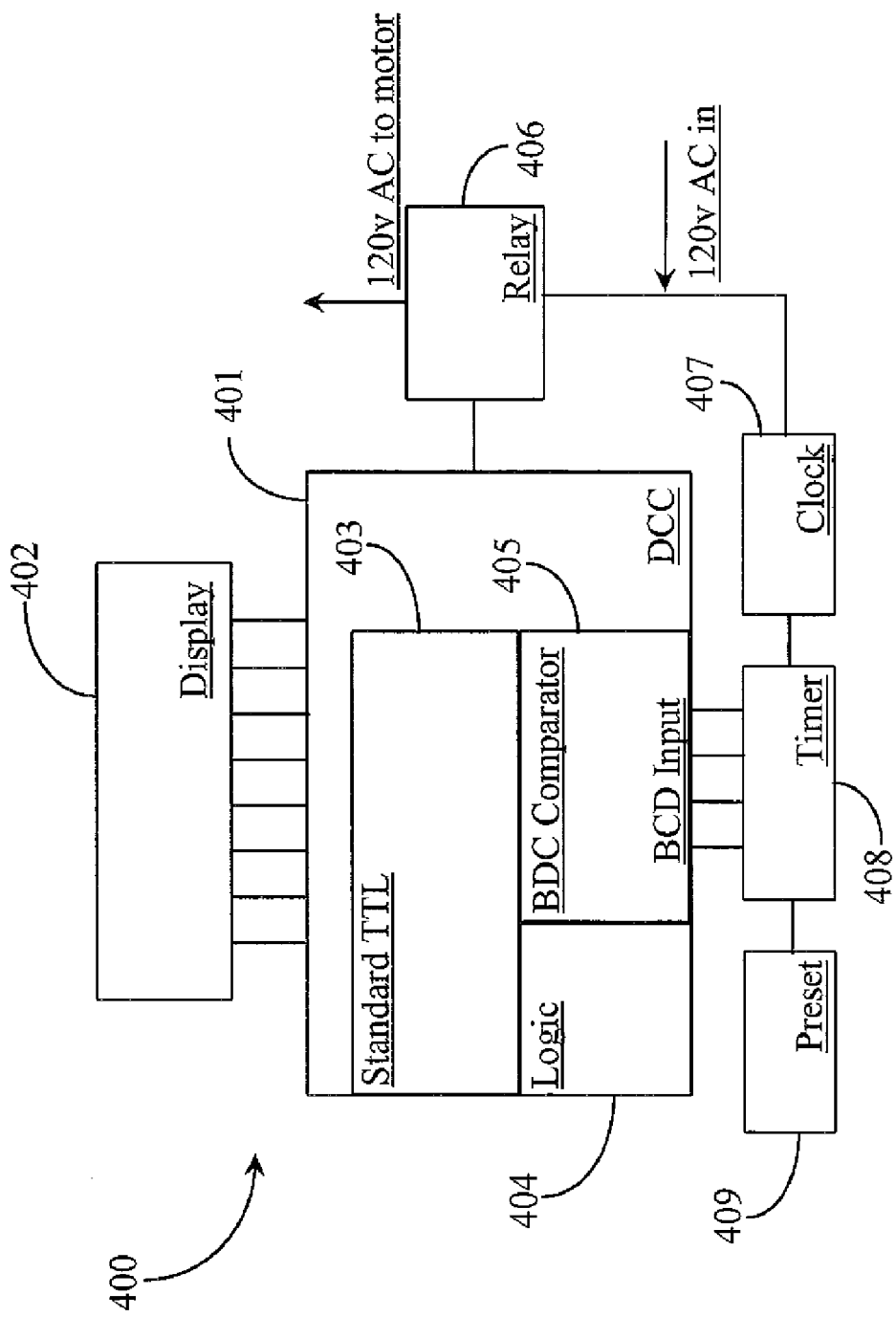
FIG. 4 is a block diagram of components of the control unit of FIG. 1 according to an embodiment of the present invention.

FIG. 4 is a schematic diagram illustrating control unit electronics 400 according to an embodiment of the present invention. The control unit of the present invention uses a simple digital control circuitry (DCC) 401. A display circuit 402 is connected to DCC 401 for the purpose of displaying information to a user. Transistor-Transistor Logic (TTL) circuitry 403 is included in the DCC circuitry for isolating inputs and performing logic switching and driving a large output. Logic 404 is provided with the DCC unit for insuring that the light mover assembly does not stop twice at a same stop sensor after a turn-around at the end of a track. In a preferred embodiment Flip Flop logic circuits are used to prevent undesired stops at each sensor.

A binary coded decimal (BCD) comparator 405 is provided to compare BCD rotary switch state to an hour and minute BCD counter. When these values are equal, the BCD comparator outputs a reset command (system reset). A preset circuit 409 is provided to enable a user to preset a timeout period according to photoperiod and plant stage requirements. A timer 408 is provided to keep the timeout period and gives the comparator the BCD input. A system clock 407 is provided and is typical for electronics that perform time-based functions. A relay 406 is provided and adapted to enable power in to the control unit (120 v AC), through relay 406 to the motor of the track lighting system. Inputs into DCC 401 such as photo sensor input and magnetic switch input are not illustrated in this example, but may be presumed present in every operation.

It is noted herein that the specific electronics control circuitry illustrated in this example is not to be construed as a limitation in the electronic architecture for enabling practice of the present invention. The inventor chooses the type of circuitry illustrated because of simplicity, reliability, and lower power consumption. However, in other embodiments other electronics architectures including use of different components, different connection types, and integrated circuits (ICs) are plausible.

Figure 5:
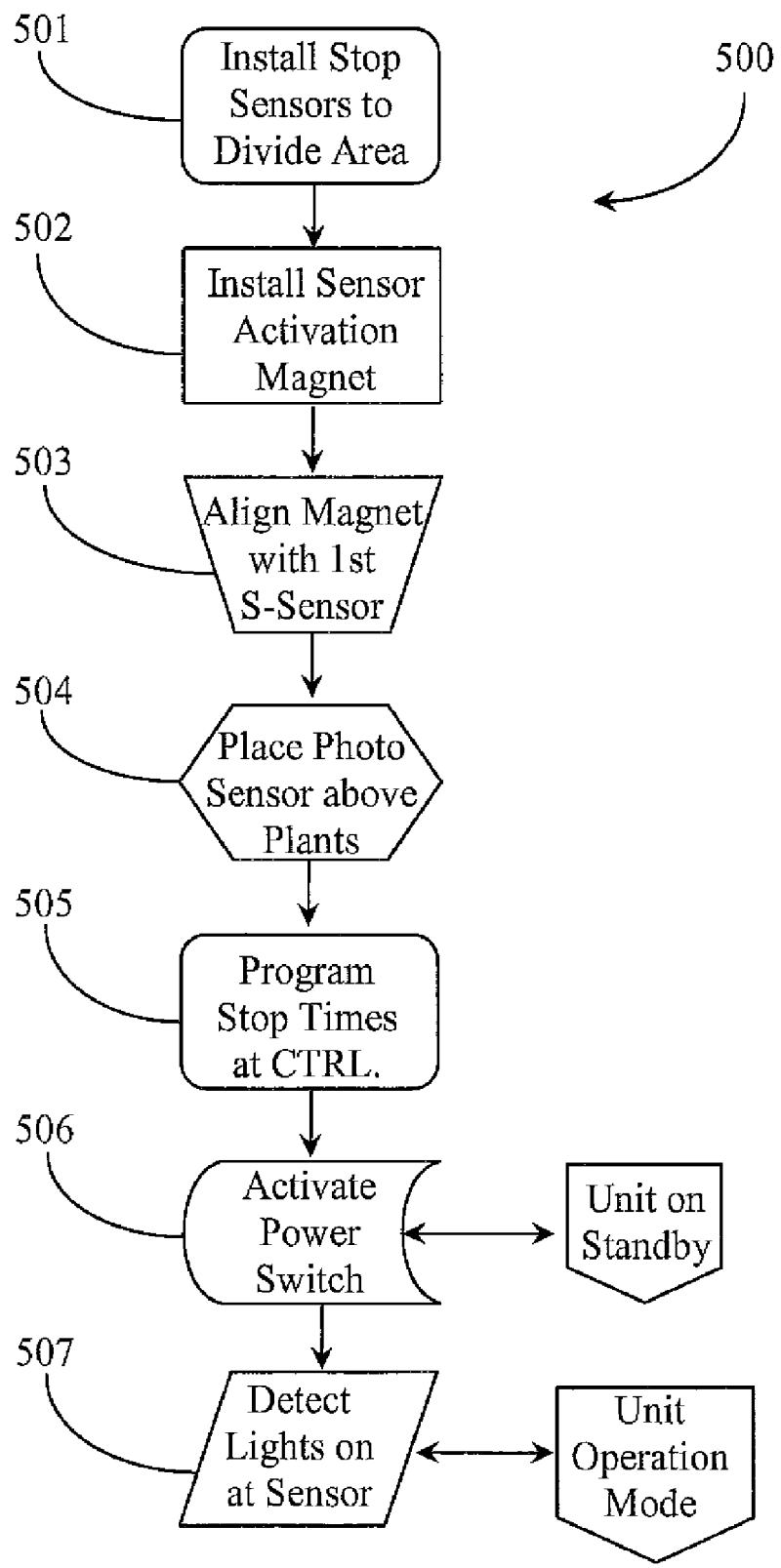
FIG. 5 is a process flow chart illustrating steps for adapting a track lighting system for preset pauses according to an embodiment of the present invention.

FIG. 5 is a process flow chart illustrating steps 500 for adapting a track lighting system for preset timeouts according to an embodiment of the present invention. At step 501, a user installs stop sensors to the track supports of a track lighting system in a manner as to divide the garden area into equal spaces that are adequately covered by the garden lights. At step 502 the user installs the stop sensor activation magnet. In one embodiment the sensor activation magnet may be installed using a bracket and installation hardware fasteners. The magnet is optionally installed at a position central to the lighting assembly such as on the lamp support beam.

At step 503, the user aligns the installed activation magnet with the first stop sensor. In this step the user may have to move the lighting assembly into a proper position on the track system in order to accomplish the magnet installation and alignment. In one embodiment the first stop sensor will cause a timeout once the system is activated by photo sensor (107) described previously. In a preferred embodiment the lights and system 110 are off during installation and alignment.

At step 504 the user connects the photo sensor (107) to the control unit (111) and positions the photo sensor in a convenient location above the tallest plant. The photo sensor is adapted to detect occurrence of ambient light such as when the garden area lights are turned on to mark the beginning of a new photoperiod. In a preferred embodiment when in operation in one embodiment the system carries the lighting assembly to the $1^{st}$ stop sensor stopping for the preset time than to the $2^{nd}$ sensor and the $3^{rd}$ repeating the timeouts as the $1^{st}$ sensor. If setup is correct the photo period should end at the $3^{rd}$. sensor. When the photo period begins for the next day the moving parts of the assembly pass stop sensors 3, 2 & 1 because the flip flop logic has only a 1 count at its input, as the moving parts of the assembly turn around and head back to the $1^{st}$ stop sensor, the activation magnet aligns with the $1^{st}$ stop sensor, at that time the moving parts of the assembly and activation magnet will stop because that sensors flip flop now has 2 counts at its input, satisfying requirements for stop condition.

At step 505 the user may preset or program stop times (timeouts) at the controller using a provided interface. In one embodiment the user enters general data into the control unit first such as the overall area (square feet), the photoperiod length (number of hours), plant stages, and number of stop sensors (divisions of garden area) that were installed. The system may calculate a suggested timeout period for the stop sensors.

The user may then activate the power switch at the control unit in step 506. In a preferred embodiment activation or power on of the system is performed with the garden lights turned off subjecting the unit to a standby mode. At step 507 the unit detects lights on at the photo sensor when the garden area lights come on marking the beginning of a photoperiod. The unit is now in operational mode and moves to the next stop sensor for the first timeout. In this case, the first stop sensor is the last timeout. In another case the control unit may be programmed to take the first timeout at the first stop sensor, which would be indicated before any movement of the system. In one embodiment a further step is added to process steps 500 for calibrating the photo sensor sensitivity to ambient lighting.

Figure 6:
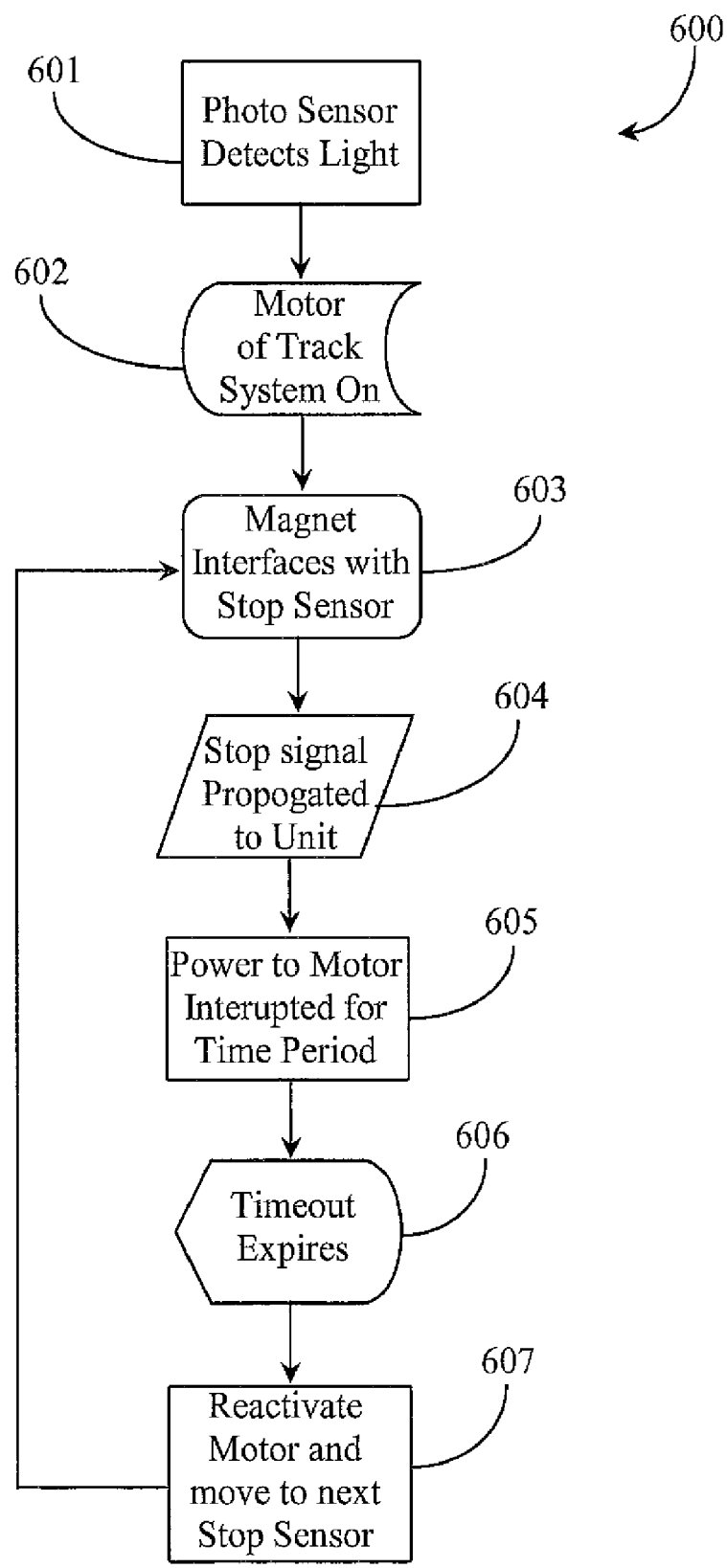
FIG. 6 is a process flow chart illustrating steps for operating a track lighting system enhanced for preset pauses according to an embodiment of the present invention.

FIG. 6 is a process flow chart illustrating steps 600 for operating a track lighting system enhanced for preset timeouts according to an embodiment of the present invention. At step 601 the photo sensor detects ambient light at a preset level indicating that the garden area lamps have been turned on. The motor of the track system is powered on at step 602 as a result of completing step 601. In one embodiment whenever to motor of the track lighting system is powered on the lighting assembly immediately begins moving along the track system toward a next stop sensor. If it is powered on while in alignment with a stop sensor, the stop signal may be ignored until the unit receives a next stop signal from the next stop sensor installation point on the track system. In this case, the first stop sensor where the motor began moving the track lighting system becomes the point of the last timeout of the photoperiod.

The activation magnet interfaces with a next stop sensor at step 603 when the stop sensor and activation magnet align in close proximity as the track lighting system moves along the track. A signal to stop the motor is propagated from the point of the interfaced stop sensor at step 604. The stop signal may be a small voltage (5V) DC signal that causes power to the motor to be temporarily disconnected. Power to the motor of the track lighting system remains interrupted for the duration of a timeout period applicable at the point of service (stop sensor). The timeout period is managed by a timer in the control unit.

At step 606 the timeout expires indication of which may be communicated to the microcontroller from the timer. The system reactivates the motor of the track lighting system at step 607 whereupon the track lighting assembly automatically moves on along the track to the next installed stop sensor. It is noted herein that the stop signal is recognized by the system only after the track light assembly has moved a certain distance to the next stop sensor. The stop sensor signal is not recognized after a time out has expired before movement to the next stop sensor. In one embodiment the stop sensors are configured by circuit to pulse the stop sensor signal one time and to shut off the signal after the first pulse. In this way the system is not still receiving a stop signal during or immediately after a timeout period.

The process loop[s from step 607 back to step 603 where the activation magnet comes into alignment with the next stop sensor and the timeout cycle continues until the lighting assembly has traveled over all of the covered area of the garden. The first stop sensor used for alignment may be the $1^{st}$ timeout for the system when the activation magnet starts from the outside of the $3^{rd}$ stop sensor, This order of sequence could reverse if the activation magnet starts to the outside of the $1^{st}$ stop sensor.

Figure 7:
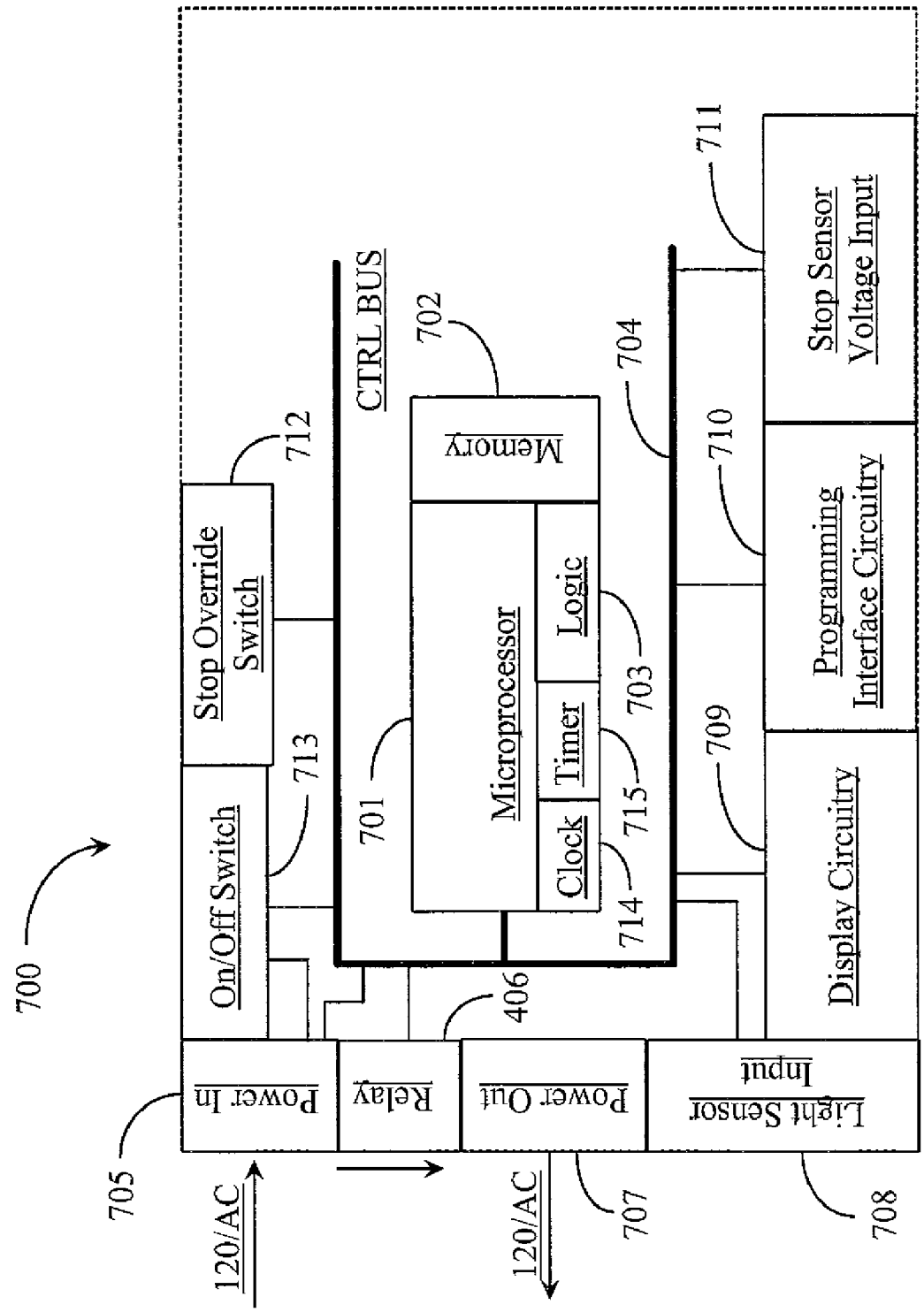
FIG. 7 is a block diagram illustrating electronic components of a control unit according to another embodiment of the present invention.

FIG. 7 is a block diagram of components 700 of the control unit of FIG. 1 according to another embodiment of the present invention. In this example, control unit 700 is a computerized electronic device and includes a microprocessor or controller 701 for processing commands and information. Microprocessor 701 has access to a memory block 702, which may include random access memory (RAM) and or some non-volatile memory like Flash memory. A logic block 703 is also provided in this example. Logic block 703 contains the logic required to handle multiple stop sensor timeouts of differing times if required. Logic block 703 may contain logic for ignoring a stop sensor signal near the end of a timeout period enabling the track lighting system motor to be re-activated. Logic block 703 may also contain logic that enables a user to enter certain information into the control unit whereupon the unit calculates a suggested timeout period based on the information entered.

In one embodiment a control bus (CTRL BUS) 704 is provided for component control and power sharing. Microprocessor 701 is connected to BUS 704 as are most of the other components illustrated in this example. Components 700 include a power-in module 705 adapted to accept 120 volt AC from a typical wall outlet. A power relay circuit 706 is provided for the purpose of relaying current to a power out module adapted to accept a typical three prong plug such as plug 300 at the end of power cord 114 of the track lighting system 106 described earlier in this specification with respect to FIGS. 1-3. In standby mode, relay 706 is switched off so no power goes out of the control system to the track lighting system. In operational mode, the relay circuit is closed enabling power to the track lighting system.

Components 700 include a light sensor input module 708 adapted to receive a signal from a connected light sensor (107) that is interpreted as a command to transition from standby mode (no power to track light motor) to operational mode (power to track light motor). In one embodiment components 700 includes display circuitry 709 for enabling some form of visual display such as a touch screen display or a liquid crystal display (LCD). Components 700 may include a programming interface circuitry 710 adapted to enable presetting of timeouts, sensor calibration, time and date, and the like. In one embodiment the controller includes one or more preset memory buttons that may be assigned specific time out periods for faster programming. In that case, presets may be stored in memory 702.

Components 700 include a stop sensor voltage signal input module 711 that is adapted to receive five volt direct current (5V DC) from the stop sensor line into the control unit. The stop sensor signal is interpreted as a command to open the relay circuit disabling power to the track lighting system motor. Components 700 may include a stop override switch 712, which may be manually activated at the control unit if it is desired to restart the motor of the track lighting system before the end of a timeout period. Components 700 include a power on/power off switch 713 for powering the control unit on or off. Components 700 also include a clock 714, and a timer 715 adapted to keep the current time and date and to manage the timeout periods.

In this example control unit (111) is a computerized device. In a simple embodiment of the present invention, control unit 111 contains a simple controller circuit with a relay, power in and power out modules, a display circuit, a clock, a timer, and a preset circuit such as was described with reference to FIG. 4 above. Components 700 may include more or fewer features without departing from the spirit and scope of the present invention. For example, in one embodiment components 700 include wireless transceiver circuitry for communicating wirelessly to standalone sensors. A computer interface for remote programming may also be provided such as a USP port or serial port. There are many different architectural possibilities.

The system of the present invention saves power and reduces costs because the track motor is only on when the lighting assembly moves between two stop sensors. The system of the invention may be integrated with any motorized light moving system. In one embodiment stop sensors may be motion detectors that are activated by close proximity movement instead of a magnet. In another embodiment the stop sensors may be enabled to transmit a signal wirelessly to the control unit. In still another embodiment the stop sensors are physically tripped by an object that makes physical contact with them such as an automated switch activator mounted on the track bar of the lighting assembly. There are many possibilities.

It will be apparent to one with skill in the art that the track lighting control system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for controlling a motorized track light system comprising:
    a control unit with an electrical power input and output line, the control unit connected to the motor on the track light system by the output line;
    a plurality of stop sensors strategically disposed along the track of the track light system;
    a sensor activation magnet strategically located on a track lighting assembly of the track light system, the magnet positioned to interface with the stop sensors; and
    a sensor for detecting ambient light of a preset level;
    characterized in that the sensor detects a preset level of ambient light causing power to the motor of the track light system via the electrical output line moving the lights along the track until the activation magnet interfaces with a first of the plurality of stop sensors thereby producing a voltage signal from the point of interface to the control unit interrupting the electrical power and stopping the motor and tracking of the track light system for a selectable preset period of time that has been programmed into the control unit through a physical interface on the control unit and corresponds to all stop sensors, whereby at the end of the preset time period, the electrical power is restored to the motor moving the lighting assembly of the track light system along the track to the next of the plurality of stop sensors.

2. The system of claim 1 wherein the signal is a 5V direct current (DC).

3. The system of claim 1 used to control the supply of artificial lighting to an indoor garden.

4. The system of claim 1 wherein the plurality of stop sensors are wired in parallel.

5. The system of claim 1 wherein the DC is switched by the stop sensors internal magnetic switch providing the DC when the activation magnet is aligned with stop sensor.

6. The system of claim 1 wherein the wire connecting the plurality of sensors is a phone line connected to the control unit by a phone jack.

7. The system of claim 1 wherein the voltage signal to the control unit resulting from magnetic interface with a stop sensor is ignored during and at the end of the preset time period with the aid of a piece of digital logic installed in the control unit.

8. A method of operation of a motorized track light system using a control unit with an electrical power input and output line, a plurality of stop sensors strategically disposed along the track of the track light system and a sensor activation magnet bracketed to a light support beam of the track light system comprising:
    (a) detecting a preset level of ambient light using a light sensor and transitioning from standby to active by supplying power to the track light system motor;
    (b) moving the light support beam along the track of the track light system until the sensor activation magnet interfaces with a stop sensor;
    (c) as a result of completion of step (b), sending a signal to the control unit interrupting power to the track light system motor stopping movement of the light support beam along the track for a preset period of time;
    (d) at the end of the preset time period of step (c), resuming power to the track light system motor and moving the light support beam along the track of the track light system until the sensor activation magnet interfaces with a next stop sensor; and
    (e) repeating the cycle of steps (c) and (d) for each subsequent stop sensor installed on the track of the track light system.

9. The method of claim 8 wherein the motorized track light system is installed over an indoor garden.

10. The method of claim 8 wherein in step (d) the stop signal is ignored with the aid of a piece of digital logic installed in the control unit.

11. The method of claim 8 wherein a further step is added for moving from active to standby mode as a result of lowering the level of ambient light below the threshold preset for the ambient light sensor.

* * * * *